United States Patent [19]

Huff et al.

[11] 4,116,490

[45] Sep. 26, 1978

[54] CABLE TYPE LOCK FOR WIRE WHEEL HUBCAPS

[76] Inventors: Eddie Huff, 1949 Handley Ave., SW., Atlanta, Ga. 30310; Walter L. Huff, 149 Martha Ave., NE., Atlanta, Ga. 30317

[21] Appl. No.: 811,354

[22] Filed: Jun. 29, 1977

[51] Int. Cl.$^2$ .............................................. B60B 7/00
[52] U.S. Cl. ........................... 301/37 AT; 301/37 SS; 70/163
[58] Field of Search ................. 70/163, 18; 220/37 S; 301/37 R, 37 AT, 37 P, 108 R, 108 A, 38 R, 37 SS, 37 CM

[56] References Cited

U.S. PATENT DOCUMENTS

| | | | |
|---|---|---|---|
| 1,481,750 | 1/1924 | Sevigny | 220/37 S |
| 1,858,893 | 5/1932 | Heyer | 70/18 |
| 2,601,017 | 6/1952 | Herrick | 301/108 R |
| 2,695,195 | 11/1954 | O'Day | 301/37 AT |
| 2,722,822 | 11/1955 | Thomas | 301/37 AT |
| 3,783,656 | 6/1974 | Foote | 70/18 |

Primary Examiner—Robert B. Reeves
Assistant Examiner—H. Grant Skaggs
Attorney, Agent, or Firm—Beveridge, DeGrandi, Kline & Lunsford

[57] ABSTRACT

A hubcap theft prevention device which comprises a relatively elongate flexible member attached at one end thereof to a hubcap and attached at the other end thereof to a lug of a lug mounted vehicle wheel. The relatively elongate flexible member is preferably of a length so that the hubcap may be displaced from the vehicle wheel a sufficient distance to provide ready access to the lugs by which the vehicle wheel is mounted on a vehicle.

7 Claims, 5 Drawing Figures

FIG.3
FIG.4
FIG.5
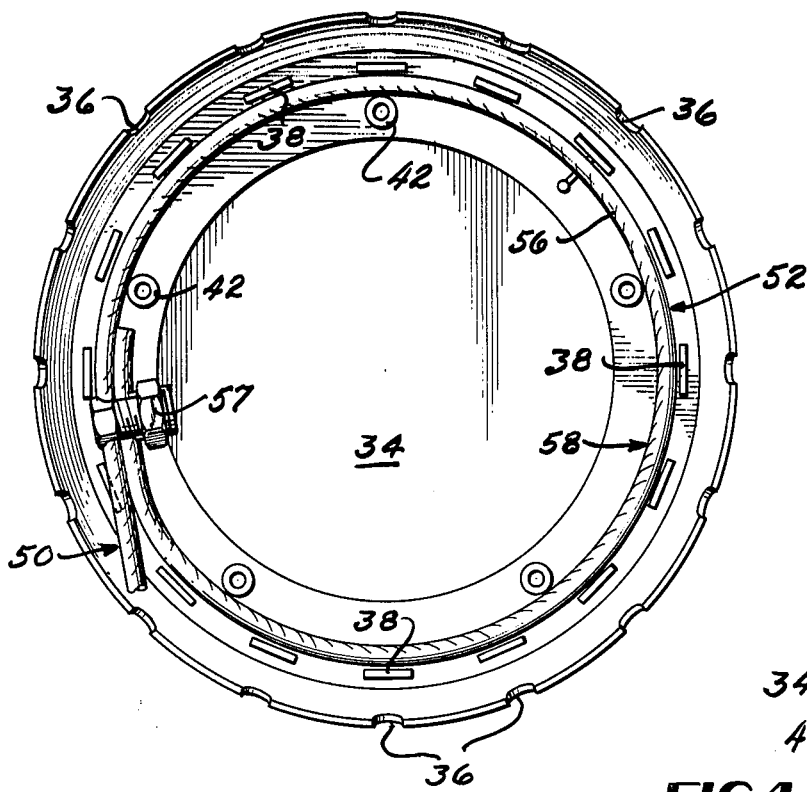
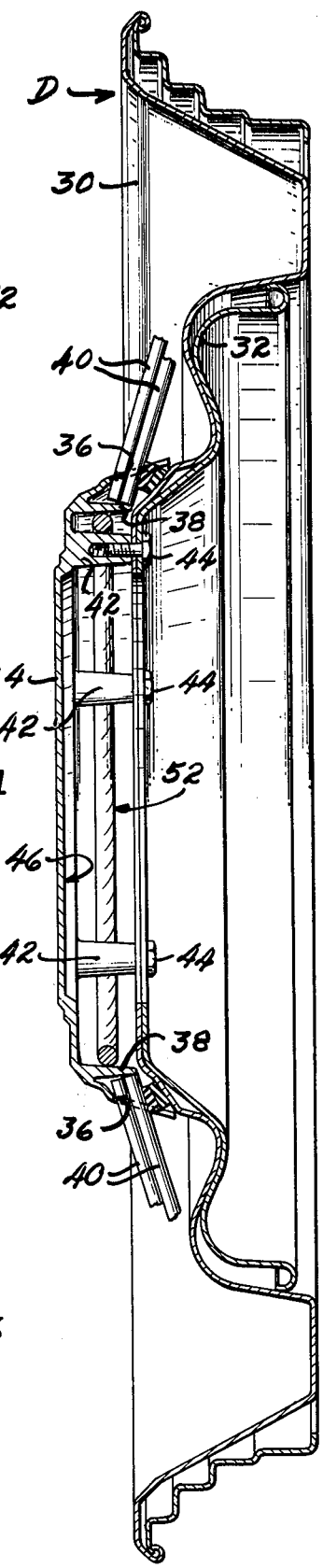
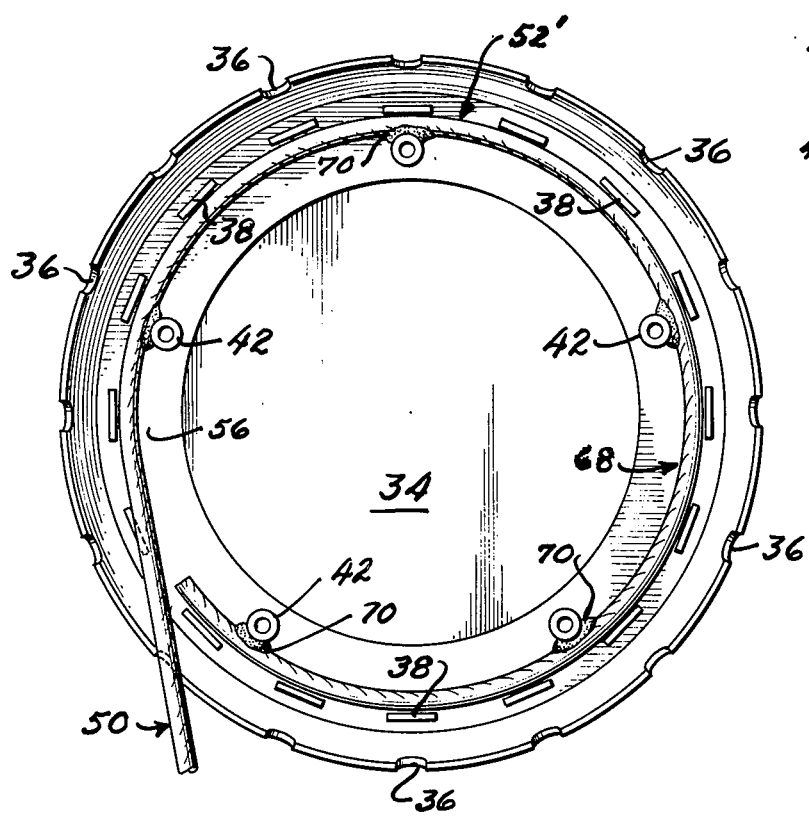

CABLE TYPE LOCK FOR WIRE WHEEL HUBCAPS

BRIEF BACKGROUND, FIELD AND OBJECTIVES OF THE INVENTION

This invention relates to improvements in hubcap theft prevention devices.

Many of today's automobiles are provided with very expensive decorative hubcaps, such as wheel covers, wire wheels, etc. Since decorative hubcaps of this type considerably enhance the overall appearance of the automobile, cost quite a lot, and can usually be very easily removed from the vehicle wheel with a pry bar in a matter of seconds, they are extremely susceptible to theft. We are aware that others have provided vehicle wheel attachments of various construction or configuration whereby such attachments can be relatively fixedly secured to a vehicle wheel, to prevent theft. Such attachments have included specially made hubcaps which can be locked directly onto a vehicle wheel. However, such of these locking hubcaps as we are aware of are special made, whereas our theft prevention device does not require any change or reconstruction of commercially available hubcaps and is readily adaptable for use in association with hubcaps of virtually all manufacturers.

Since wire wheel hubcaps are probably the most expensive and thus most susceptible to theft, a wire wheel hubcap is shown and described herein as being used in association with our theft prevention device. However, it is to be understood that the invention is not limited to use only in association with wire wheel hubcaps and the like, but may be used in association with other types of hubcaps, including wheel covers, rim decorations, etc.

It is a primary object of this invention to provide an improved hubcap theft prevention device which may be used in association with most conventional hubcaps without any radical reconstruction, modification or alteration of the hubcap.

Other objects and advantages of the invention will become apparent from the following detailed description, taken in connection with the accompanying drawings, and in which drawings:

BRIEF DESCRIPTION OF THE DRAWINGS

FIG. 3 is a plan view showing the inside of the emblem-bearing cover of the wire wheel hubcap of FIG. 1 and illustrates how one end of the theft prevention device of FIG. 2 can be attached to a wire wheel hubcap.

FIG. 4 is an enlarged vertical sectional view taken substantially on the line 4—4 of FIG. 1.

FIG. 5 shows a modified form of attachment of one end of our improved theft prevention device to the wire wheel hubcap of FIG. 1.

DETAILED DESCRIPTION

Figure 1:
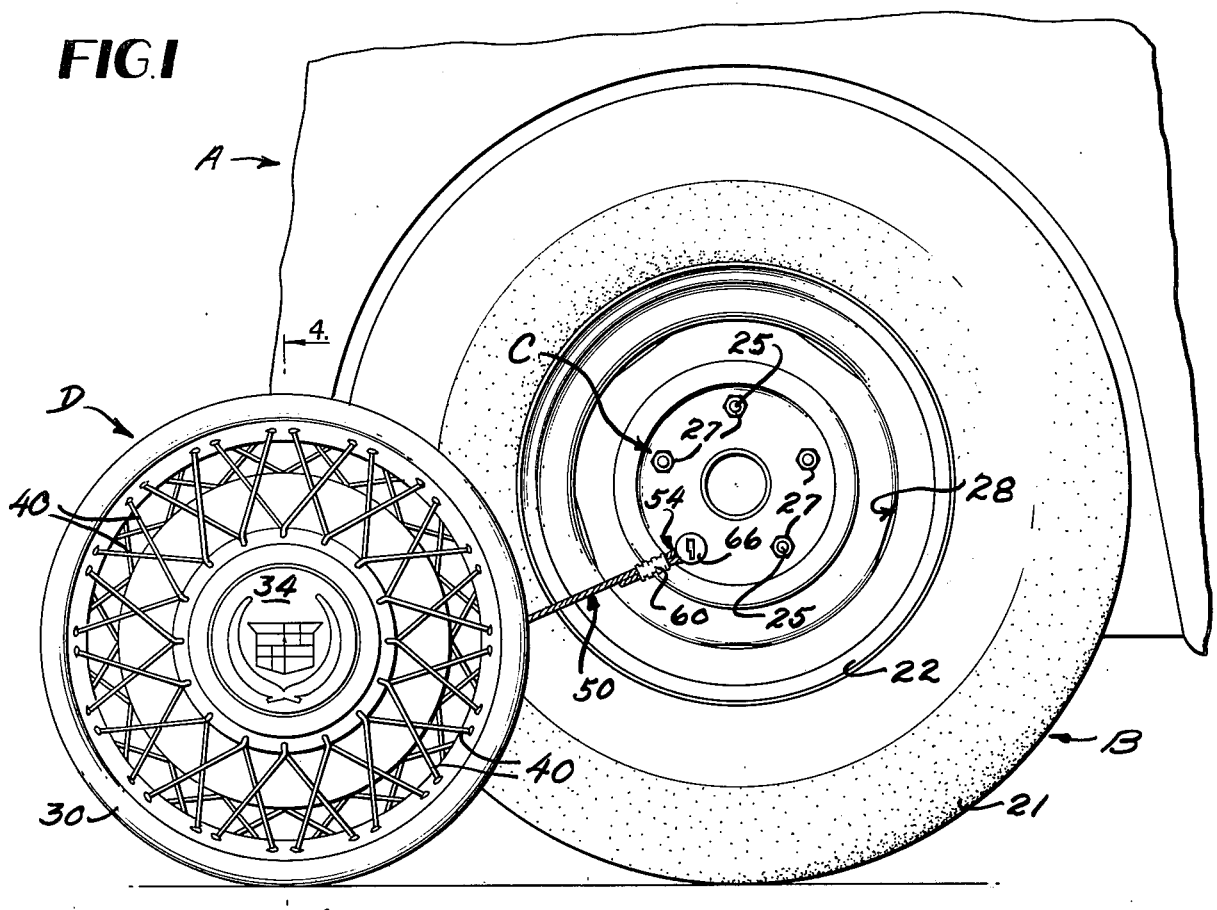
FIG. 1 is a plan view showing a wire wheel hubcap attached to a vehicle wheel by our improved theft prevention device, the wire wheel hubcap being shown as displaced from the vehicle wheel a sufficient distance to provide ready access to the lugs by which the vehicle wheel is attached to a vehicle.

In the drawings, wherein similar reference characters are used to designate corresponding parts throughout the several views, and wherein are shown various embodiments of the invention, the letter A may generally designate a vehicle, to which may be attached a vehicle wheel B such as by lug mounting means C. A wire wheel hubcap D may be provided for mounting on vehicle wheel B, hubcap theft preventing means E being provided for use in association with hubcap D and vehicle wheel B to prevent theft of hubcap D.

Vehicle wheel B may be of conventional construction, including a tire 21 mounted on a hub 22, hub 22 being provided with a plurality of spaced apart openings (not shown) which interfit over a plurality of stud bolts 25 which project outwardly from the brake drum or housing (not shown) of vehicle A, vehicle wheel B being attached to stud bolts 25 by lugs 27. Stud bolts 25 and lugs 27 thus comprise lug mounting means C for attachment of vehicle wheel B to vehicle A.

Hub 22 of vehicle wheel B is conventionally provided with an inner recess and indented portion 28 within which may be removably interfitted a hubcap.

Wire wheel hubcap D is of a conventional construction, including a mounting rim 30 of an outer diameter and configuration to be snugly received within recess 28 of hub 22 of vehicle wheel B, by way of attachment of the same to vehicle wheel B; a backing plate 32; and emblem-bearing cover 34.

Cover 34 may be provided with a plurality of peripheral grooves or notches 36, each of which have a projecting flange or plate 38 immediately therebehind, and by way of which a plurality of spokes 40 may be secured in juxtaposed relation between mounting rim 30 and cover 34, as shown in FIG. 4. Cover 34 may also be provided with a plurality of spaced apart studs or posts 42 by way of which cover 34 may be attached to backing plate 32 such as by bolts 44, providing an enclosed portion 46 between cover 34 and backing plate 32 and within which may be received and attached one end of hubcap theft preventing means E. In the form of wire wheel hubcap D as shown in the drawings, studs 42 are circumferentially inwardly spaced apart from projecting flanges 38, providing a clearly defined area of enclosed portion 46 within which one end of theft preventing means E may be received and attached to wire wheel hubcap D.

Figure 2:
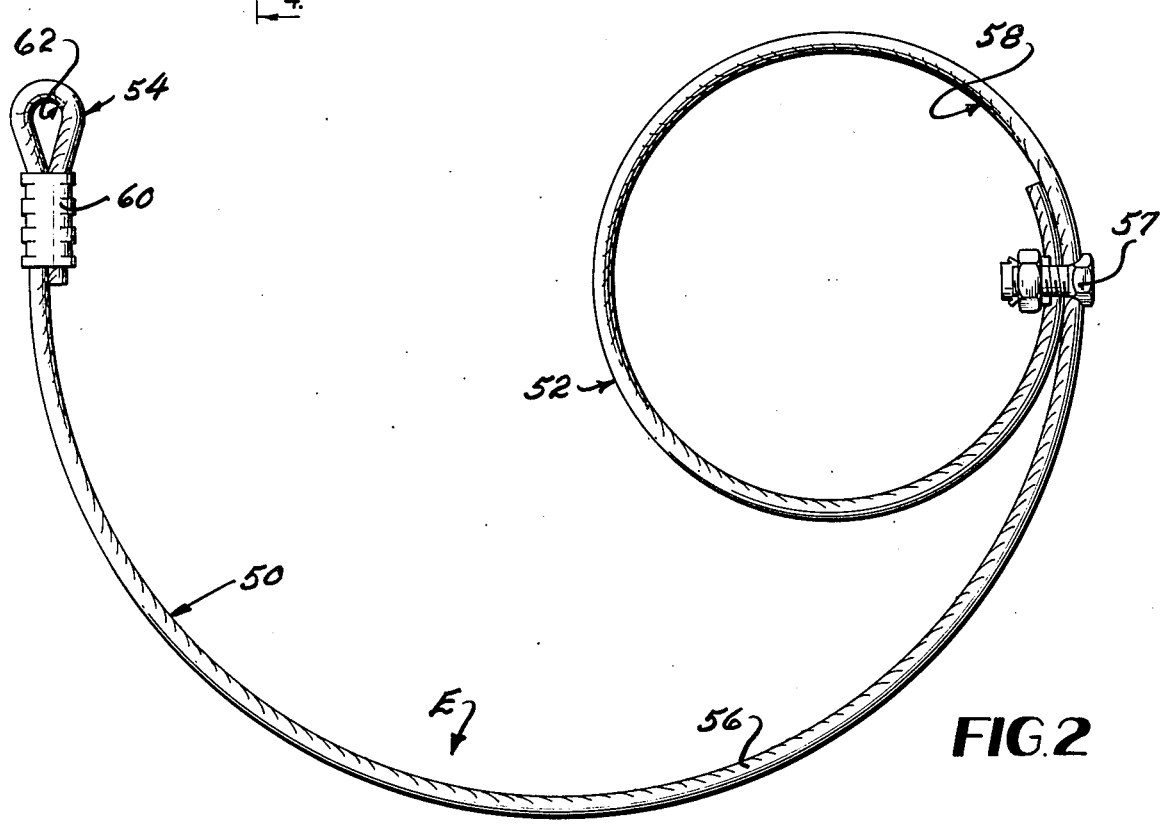
FIG. 2 is a plan view of one form of our improved theft prevention device.

In the form of invention as shown in FIG. 2, theft preventing means E comprises a relatively elongate flexible member 50 having means 52 at one end thereof for attachment thereof to a hubcap, and means 54 at the other end thereof for attachment to a vehicle wheel.

Member 50 may comprise a wire cable 56, one end of which is looped back upon itself and secured by such as an electric bolt 57 to define a closed loop 58 comprising means 52 for relatively fixed attachment of one end of member 50 to such as a wire wheel hubcap D.

The other end of cable 56 may likewise be looped back upon itself and attached such as by clamp 60 in defining a closed loop 62 at the other end of cable 56 from closed loop 58. Closed loop 62 is preferably of a dimension to be snugly received onto a stud bolt 25 of lug mounting means C and to be securely held thereon by a lug of lug mounting means C. Closed loop 62 thus comprises means 54 for relatively fixed attachment of member 50 to lug mounting means C of vehicle wheel B.

As shown in FIG. 3, closed loop 58 of member 50 is preferably of a diameter to be relatively snugly received within enclosed portion 46 between cover 34 and backing plate 32, extending between studs or posts 42 and projecting flanges 38 of cover 34. Thus, when cover 34 is attached to backing plate 32 by bolts 44, one end of member 50 will be relatively fixedly attached to wire wheel hubcap D.

It may be incidentally noted that extreme care must be exercised in removing cover 34 from backing plate 32 of wire wheel hubcap D or else wire spokes 40 thereof will fall out. Thus, closed loop 58 cannot be readily removed from its relatively fixed position of attachment between cover 34 and backing plate 32. Of course, bolts 44 could comprise self-locking bolts of a type which would require special tools in order to be removed from studs or posts 42.

As shown in FIG. 1, closed loop 62 of member 50 may have snugly received therewithin a stud bolt 25 of lug mounting means C and such stud bolt 25 may be provided with a lug 66 having lock means which requires a key or other special tool for removal of lug 66 from the stud bolt 25 to which it is attached. Such lock means may comprise a nut lock as shown in U.S. Pat. No. 3,818,731.

As previously described, and as shown in FIG. 1, relatively elongate flexible member 50 is preferably of a length to enable wire wheel hubcap D to be removed from vehicle wheel B a sufficient distance so that access can be had to at least the lug mounting means C to which closed loop 62 thereof is relatively fixedly attached.

In the form of the invention as shown in FIG. 5, means 52' for attachment of one end of hubcap theft preventing means E to wire wheel hubcap D may comprise an open loop 68 which extends within enclosed portion 46 and intermediate studs or posts 42 and projecting flanges 38 thereof of cover 34 and is secured to studs or posts 42 by such as welds 70.

Various changes in the forms of the invention herein shown and described may be made without departing from the spirit of the invention or the scope of the following claims.

We claim:

1. As an article of manufacture for use in association with a lug mounted vehicle wheel a wire wheel hubcap removably attached to the vehicle wheel and wherein said wire wheel hubcap includes a mounting rim, a cover, a plurality of spokes detachably interconnected to and extending between said mounting rim and said cover, spaced apart stud means for attaching said cover to said mounting rim whereby to securely mount said spokes in juxtaposed relationship between said mounting rim and said cover, said cover, studs and mounting rim defining a circumferential enclosed area within the hubcap and as to which a member entrained therewithin is accessible for removal therefrom only on disconnection and separation of said cover from said mounting rim, a wire wheel hubcap theft preventing device including a relatively elongate flexible member having means at one end thereof for relatively fixed attachment of said one end thereof to a lug mount of said vehicle wheel, the other end of said flexible member comprising a loop attachable about and entrained within said circumferential enclosed area, said elongate flexible member being of a length to permit said wire wheel hubcap to be removed and displaced a sufficient distance from a vehicle wheel receiving the same in order that ready access may be had to the lug mounting by which such vehicle wheel is mounted on a vehicle.

2. An article of manufacture as specified in claim 1 wherein said loop of said flexible member is secured by welding to the spaced apart studs of a hubcap.

3. An article of manufacture as specified in claim 2 wherein the lug mounting of a vehicle wheel for use in association with said flexible member includes a stud bolt having a lug engageable therewith and said means at said one end of said flexible member for attachment of said one end of said flexible member to a lug mounting of a vehicle wheel comprises a closed loop which may receive therewithin the stud bolt of such lug mounting in a snug fitting relation.

4. An article of manufacture as specified in claim 3 wherein the lug of the stud bolt of such lug mounting which receives said closed loop of said flexible member includes a lock means for preventing disengagement of such lug from the stud bolt to which it is attached.

5. An article of manufacture as specified in claim 1 wherein said other end of said flexible member comprises a closed loop.

6. An article of manufacture as specified in claim 5 wherein the lug mounting of a vehicle wheel for use in association with said flexible member includes a stud bolt having a lug engageable therewith and said means at said one end of said flexible member for attachment of said one end of said flexible member to a lug mounting of a vehicle wheel comprises a closed loop which may receive therewithin the stud bolt of such lug mounting in a snug fitting relation.

7. An article of manufacture as specified in claim 6 wherein the lug of the stud bolt of such lug mounting which receives said closed loop of said flexible member includes a lock means for preventing disengagement of such lug from the stud bolt to which it is attached.

* * * * *